(12) United States Patent
Opris et al.

(10) Patent No.: US 9,835,647 B2
(45) Date of Patent: Dec. 5, 2017

(54) APPARATUS AND METHOD FOR EXTENDING ANALOG FRONT END SENSE RANGE OF A HIGH-Q MEMS SENSOR

(71) Applicant: Fairchild Semiconductor Corporation, San Jose, CA (US)

(72) Inventors: Ion Opris, San Jose, CA (US); Justin Seng, San Jose, CA (US); Shanthi Pavan, Fremont, CA (US); Marwan Ashkar, Cupertino, CA (US); Michelle Lee, San Jose, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 250 days.

(21) Appl. No.: 14/661,426

(22) Filed: Mar. 18, 2015

(65) Prior Publication Data
US 2015/0268284 A1  Sep. 24, 2015

Related U.S. Application Data

(60) Provisional application No. 61/955,106, filed on Mar. 18, 2014.

(51) Int. Cl.
*G01R 27/26*  (2006.01)
*G01N 25/56*  (2006.01)
(Continued)

(52) U.S. Cl.
CPC .... *G01P 15/125* (2013.01); *G01P 2015/0882* (2013.01)

(58) Field of Classification Search
CPC ........ G01R 27/02; G01R 27/26; G01R 29/24; G01N 25/56; H03L 7/183; H03M 3/00; H03M 3/494
See application file for complete search history.

(56) References Cited

U.S. PATENT DOCUMENTS 4,896,156 A   1/1990 Garverick
5,491,604 A   2/1996 Nguyen et al.
(Continued)

FOREIGN PATENT DOCUMENTS

CN   1693181 A   11/2005
CN   101044684 A   9/2007
(Continued)

OTHER PUBLICATIONS

"U.S. Appl. No. 13/742,942, Supplemental Notice of Allowability dated Apr. 10, 2014", 3 pgs.
(Continued)

*Primary Examiner* — Son Le
*Assistant Examiner* — Neel Shah
(74) *Attorney, Agent, or Firm* — Brake Hughes Bellermann LLP

(57) ABSTRACT

Apparatus and methods for interfacing with a micro-electromechanical system (MEMS) sensor are provided. In an example, an apparatus can interface circuit including an integrator circuit, a sample switch circuit, a saturation detector and a controller. The saturation detector can be configured to receive a signal indicative of an integration of charge of the sensor, to compare the signal indicative of the integration of charge to an integrator saturation threshold and to modulate a divide parameter using the comparison of the signal indicative of the integration of charge and the integrator saturation threshold. The controller can be configured to receive a clock signal and to control the sample switch circuit based on a phase of the clock signal and the divide parameter.

20 Claims, 14 Drawing Sheets

(51) Int. Cl.
*G01R 27/02* (2006.01)
*G01R 29/24* (2006.01)
*H03L 7/183* (2006.01)
*G01P 15/125* (2006.01)
*G01P 15/08* (2006.01)

(56) References Cited

U.S. PATENT DOCUMENTS

| | | | |
|---|---|---|---|
| 6,356,085 B1 * | 3/2002 | Ryat | G01R 27/2605 324/658 |
| 6,664,941 B2 | 12/2003 | Itakura et al. | |
| 7,173,402 B2 | 2/2007 | Chen et al. | |
| 7,187,735 B2 | 3/2007 | Kent et al. | |
| 7,266,349 B2 | 9/2007 | Kappes | |
| 7,305,880 B2 | 12/2007 | Caminada et al. | |
| 7,339,384 B2 | 3/2008 | Peng et al. | |
| 7,403,756 B1 | 7/2008 | Jiacinto et al. | |
| 7,454,967 B2 | 11/2008 | Skurnik | |
| 7,595,648 B2 | 9/2009 | Ungaretti et al. | |
| 7,616,078 B2 | 11/2009 | Prandi et al. | |
| 7,859,352 B2 | 12/2010 | Sutton | |
| 7,965,067 B2 | 6/2011 | Grönthal et al. | |
| 8,004,354 B1 | 8/2011 | Pu et al. | |
| 8,037,755 B2 | 10/2011 | Nagata et al. | |
| 8,375,789 B2 | 2/2013 | Prandi et al. | |
| 8,476,970 B2 | 7/2013 | Mokhtar et al. | |
| 8,497,746 B2 | 7/2013 | Visconti et al. | |
| 8,508,290 B2 | 8/2013 | Elsayed et al. | |
| 8,742,964 B2 | 6/2014 | Kleks et al. | |
| 9,094,027 B2 | 7/2015 | Tao et al. | |
| 9,444,404 B2 | 9/2016 | Opris et al. | |
| 2001/0022106 A1 | 9/2001 | Kato et al. | |
| 2002/0196445 A1 | 12/2002 | Mcclary et al. | |
| 2004/0051508 A1 | 3/2004 | Hamon et al. | |
| 2004/0085784 A1 | 5/2004 | Salama et al. | |
| 2004/0088127 A1 | 5/2004 | M'closkey et al. | |
| 2009/0072663 A1 | 3/2009 | Ayazi et al. | |
| 2009/0217757 A1 | 9/2009 | Nozawa | |
| 2011/0074389 A1 | 3/2011 | Knierim et al. | |
| 2011/0120221 A1 | 5/2011 | Yoda | |
| 2011/0146403 A1 | 6/2011 | Rizzo Piazza Roncoroni et al. | |
| 2011/0179868 A1 | 7/2011 | Kaino et al. | |
| 2011/0234312 A1 | 9/2011 | Lachhwani et al. | |
| 2011/0285445 A1 | 11/2011 | Huang et al. | |
| 2012/0191398 A1 | 7/2012 | Murakami et al. | |
| 2013/0187668 A1 * | 7/2013 | Entringer | G01P 15/125 324/679 |
| 2013/0263665 A1 | 10/2013 | Opris et al. | |
| 2013/0265183 A1 | 10/2013 | Kleks et al. | |
| 2013/0268227 A1 | 10/2013 | Opris et al. | |
| 2013/0271228 A1 | 10/2013 | Tao et al. | |

FOREIGN PATENT DOCUMENTS

| | | |
|---|---|---|
| CN | 101213461 A | 7/2008 |
| CN | 101217263 A | 7/2008 |
| CN | 101329446 A | 12/2008 |
| CN | 101520327 A | 9/2009 |
| CN | 101922934 A | 12/2010 |
| CN | 102109345 A | 6/2011 |
| CN | 102332894 A | 1/2012 |
| CN | 103363983 A | 10/2013 |
| CN | 103368503 A | 10/2013 |
| CN | 103368577 A | 10/2013 |
| CN | 103376099 A | 10/2013 |
| CN | 203261317 U | 10/2013 |
| CN | 203349832 U | 12/2013 |
| CN | 203719664 U | 7/2014 |
| EP | 1055910 A1 | 11/2000 |
| EP | 2096759 A1 | 9/2009 |
| EP | 2259019 A1 | 12/2010 |
| EP | 2647593 B1 | 8/2016 |
| JP | 2009192458 A | 8/2009 |
| KR | 1020130112792 A | 10/2013 |
| KR | 1020130113385 A | 10/2013 |
| KR | 1020130113391 A | 10/2013 |
| KR | 1020130116189 A | 10/2013 |
| WO | WO-2008014246 A1 | 1/2008 |
| WO | WO-2011107542 A2 | 9/2011 |

OTHER PUBLICATIONS

"U.S. Appl. No. 13/857,349, Non Final Office Action dated Oct. 8, 2015", 10 pgs.

"U.S. Appl. No. 13/857,349, Response filed Jan. 8, 2016 to Non Final Office Action dated Oct. 8, 2015", 10 pgs.

"Chinese Application Serial No. 201310119806.8, Office Action dated Jul. 3, 2015", w/ English Claims, 12 pgs.

"Chinese Application Serial No. 201310119806.8, Response filed Jan. 18, 2016 to Office Action dated Jul. 3, 2015", (English Translation of Claims), 11 pgs.

"Chinese Application Serial No. 201310119986.X, Office Action dated Dec. 18, 2015", w/ English Translation, 6 pgs.

"Chinese Application Serial No. 201310119986.X, Response flied Sep. 25, 2015 to Office Action dated May 12, 2015", w/ English Claims, 7 pgs.

"Chinese Application Serial No. 201310120172.8, Office Action dated Nov. 3, 2015", w/ English Translation, 11 pgs.

"Chinese Application Serial No. 201310127961.4, Response filed Sep. 2, 2015 to Office Action dated May 6, 2015", w/ English Claims, 19 pgs.

"European Application Serial No. 13001695.9, Response filed Aug. 24, 2015 to Extended European Search Report dated Jan. 22, 2015", 9 pgs.

"European Application Serial No. 13001720.5, Extended European Search Report dated Aug. 20, 2015", 7 pgs.

"U.S. Appl. No. 13/857,349, Notice of Allowance dated May 6, 2016", 9 pgs.

"U.S. Appl. No. 13/857,363, Non Final Office Action dated Aug. 5, 2016", 8 pgs.

"Chinese Application Serial No. 201310119806.8, Office Action dated May 13, 2016", with English translation of claims, 11 pgs.

"Chinese Application Serial No. 201310119806.8, Response filed Sep. 28, 2016 to Office Action dated May 13, 2016", with English translation of claims, 13 pgs.

"Chinese Application Serial No. 201310119986.X, Response filed Apr. 29, 2016 to Office Action dated Dec. 18, 2015", (English Translation of Claims), 14 pgs.

"Chinese Application Serial No. 201310120172.8, Office Action dated Aug. 1, 2016", with English translation of claims, 19 pgs.

"Chinese Application Serial No. 201310120172.8, Response filed May 18, 2016 to Office Action dated Nov. 3, 2015", with English translation of claims, 21 pgs.

"Chinese Application Serial No. 201310120172.8, Response filed Oct. 17, 2016 to Office Action dated Aug. 1, 2016", with English translation of claims, 20 pgs.

"European Application Serial No. 13001917.7, Extended European Search Report dated Apr. 11, 2016", 5 pgs.

"U.S. Appl. No. 13/857,363, Notice of Allowance dated Dec. 2, 2016", 8 pgs.

"U.S. Appl. No. 13/857,363, Response filed Nov. 7, 2016 to Non Final Office Action dated Aug. 5, 2016", 12 pgs.

"Chinese Application Serial No. 201310119986.X, Office Action dated Dec. 27, 2016", with English Translation, 12 pgs.

"Chinese Application Serial No. 201310120172.8, Office Action dated Dec. 8, 2016", with English Translation, 11 pgs.

"European Application Serial No. 13001917.7, Response filed Nov. 8, 2016 to Office Action dated Apr. 11, 2016", 16 pgs.

"U.S. Appl. No. 13/742,942, Notice of Allowance dated Jan. 28, 2014", 9 pgs.

"U.S. Appl. No. 13/742,942, Notice of Allowance dated Jan. 28, 2014", 8 pgs.

"U.S. Appl. No. 13/742,942, Supplemental Notice of Allowability dated Apr. 10, 2014", 2 pgs.

"U.S. Appl. No. 13/860,761, Advisory Action dated Mar. 25, 2015", 3 pgs.

(56) References Cited

OTHER PUBLICATIONS

"U.S. Appl. No. 13/860,761, Final Office Action dated Jan. 15, 2015", 14 pgs.
"U.S. Appl. No. 13/860,761, Non Final Office Action dated Aug. 19, 2014", 13 pgs.
"U.S. Appl. No. 13/860,761, Notice of Allowance dated Apr. 28, 2015", 8 pgs.
"U.S. Appl. No. 13/860,761, Response filed Mar. 16, 2015 to Final Office Action dated Jan. 16, 2015", 12 pgs.
"U.S. Appl. No. 13/860,761, Response filed Apr. 16, 2015 to Advisory Action dated Mar. 25, 2015", 11 pgs.
"U.S. Appl. No. 13/860,761, Response filed Dec. 19, 2014 to Non Final Office Action dated Aug. 19, 2014", 12 pgs.
"Chinese Application Serial No. 201310119986.X, Office Action dated May 12, 2015", w/ English Claims, 14 pgs.
"Chinese Application Serial No. 201310127961.4, Office Action dated May 6, 2015", w/ English Claims, 7 pgs.
"Chinese Application Serial No. 201320171757.8, Office Action dated Jul. 11, 2013", w/English Translation, 2 pgs.
"Chinese Application Serial No. 201320171757.8, Response filed Jul. 25, 2013 to Office Action dated Jul. 11, 2013", w/English Translation, 21 pgs.
"Chinese Application Serial No. 201320172128.7, Office Action dated Jul. 12, 2013", w/English Translation, 3 pgs.
"Chinese Application Serial No. 201320172128.7, Response filed Aug. 7, 2013 to Office Action dated Jul. 12, 2013", w/English Translation, 39 pgs.
"Chinese Application Serial No. 201320172366.8, Office Action dated Jan. 30, 2014", w/English Claims, 3 pgs.
"Chinese Application Serial No. 201320172366.8, Office Action dated Jul. 9, 2013", w/English Translation, 3 pgs.
"Chinese Application Serial No. 201320172366.8, Office Action dated Oct. 25, 2013", w/English Translation, 8 pgs.
"Chinese Application Serial No. 201320172366.8, Response filed Mar. 18, 2014 to Office Action dated Jan. 30, 2014", w/English Claims, 20 pgs.
"Chinese Application Serial No. 201320172366.8, Response filed Sep. 16, 2013 to Office Action dated Jul. 9, 2013", w/English Translation, 24 pgs.
"Chinese Application Serial No. 201320172366.8, Response filed Dec. 24, 2013 to Office Action dated Oct. 25, 2013", w/English Claims, 11 pgs.
"Chinese Application Serial No. 201320185461.1, Office Action dated Jul. 23, 2013", w/English Translation, 3 pgs.
"Chinese Application Serial No. 201320185461.1, Response filed Sep. 10, 2013 to Office Action dated Jul. 23, 2013", w/English Translation, 25 pgs.
"European Application Serial No. 13001695.9, European Search Report dated Oct. 5, 2014", 6 pgs.
"European Application Serial No. 13001695.9, Extended European Search Report dated Jan. 22, 2015", 8 pgs.
"European Application Serial No. 13001721.3, Extended European Search Report dated Jul. 18, 2013", 9 pgs.
"European Application Serial No. 13001721.3, Response filed Apr. 7, 2014 to Extended European Search Report dated Jul. 18, 2013", 25 pgs.
Dunn, C, et al., "Efficient linearisation of sigma-delta modulators using single-bit dither", Electronics Letters 31(12), (Jun. 1995), 941-942.
Ferreira, Antoine, et al., "A Survey of Modeling and Control Techniques for Micro- and Nanoelectromechanical Systems", IEEE Transactions on Systems, Man and Cybernetics—Part C: Applications and Reviews vol. 41, No. 3., (May 2011), 350-364.
Fleischer, Paul E, "Sensitivity Minimization in a Single Amplifier Biquad Circuit", IEEE Transactions on Circuits and Systems. vol. Cas-23, No. 1, (1976), 45-55.
Kulah, Haluk, et al., "Noise Analysis and Characterization of a Sigma-Delta Capacitive Silicon Microaccelerometer", 12th International Conference on Solid State Sensors, Actuators and Microsystems, (2003), 95-98.
Reljin, Branimir D, "Properties of SAB filters with the two-pole single-zero compensated operational amplifier", Circuit Theory and Applications: Letters to the Editor. vol. 10, (1982), 277-297.
Sedra, Adel, et al., "Chapter 8.9: Effect of Feedback on the Amplifier Poles", Microelectronic Circuits, 5th edition, (2004), 836-864.
Sherry, Adrian, et al., "AN-609 Application Note: Chopping on Sigma-Delta ADCs", Analog Devices, [Online]. Retrieved from the Internet: <URL: http://www.analog.com/static/imported-files/application_notes/AN-609.pdf>, (2003), 4 pgs.
Song-Hee, Cindy Paik, "A MEMS-Based Precision Operational Amplifier", Submitted to the Department of Electrical Engineering and Computer Sciences MIT, [Online]. Retrieved from the Internet: <URL: http://dspace.mit.edu/bitstream/handle/1721.1/16682/57138272.pdf? . . . >, (Jan. 1, 2004), 123 pgs.

\* cited by examiner

APPARATUS AND METHOD FOR EXTENDING ANALOG FRONT END SENSE RANGE OF A HIGH-Q MEMS SENSOR

PRIORITY AND RELATED APPLICATIONS

This application claims the benefit of priority to U.S. Provisional Patent Application Ser. No. 61/955,106 filed on Mar. 18, 2014, titled, "A METHOD OF EXTENDING THE INPUT RANGE OF THE ANALOG FRONT END IN A HIGH-Q ACCELEROMETER SENSOR," which is incorporated by reference herein in its entirety.

OVERVIEW

Apparatus and methods for interfacing with a microelectromechanical system (MEMS) sensor are provided. In an example, an apparatus can interface circuit including an integrator circuit, a sample switch circuit, a saturation detector and a controller. The saturation detector can be configured to receive a signal indicative of an integration of charge of the sensor, to compare the signal indicative of the integration of charge to an integrator saturation threshold and to modulate a divide parameter using the comparison of the signal indicative of the integration of charge and the integrator saturation threshold. The controller can be configured to receive a clock signal and to control the sample switch circuit based on a phase of the clock signal and the divide parameter.

This overview is intended to provide a partial summary of the subject matter of the present patent application. It is not intended to provide an exclusive or exhaustive explanation of the invention. The detailed description is included to provide further information about the present patent application.

DETAILED DESCRIPTION

Figure 1:
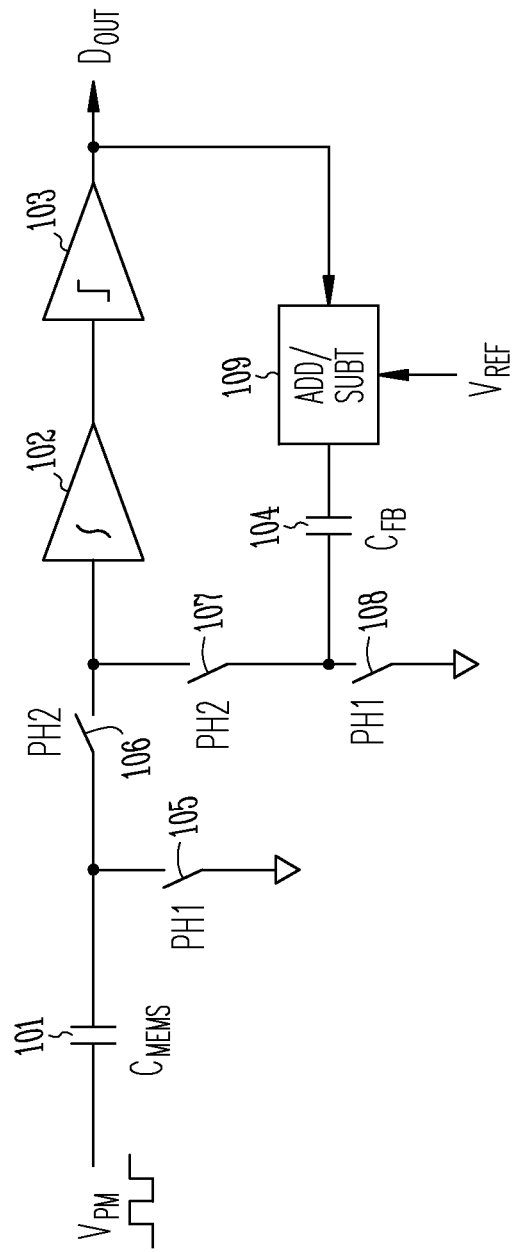
FIG. 1 illustrates and existing circuit for providing a capacitance measurement of a MEMS sensor.

A MEMS accelerometer can provide acceleration measurements based on reading capacitance variation of a MEMS structure under acceleration stress. This reading can be done with an electronic circuit as in FIG. 1 that can provide an output pulse stream indicative of charge on the sense capacitor 101 of the MEMS sensor. While a single-ended implementation is been shown, fully differential implementations are widely used. Also, a first order sigma-delta A/D modulator is shown in FIG. 1 for simplicity although implementations using higher order modulators are more typical. Methods described herein can be applicable to such higher order implementations.

The MEMS capacitance can be read using a modulation signal on the proof mass (PM). During a first phase of the clock (ph1), the MEMS capacitance ($C_{MEMS}$) can be charged to the PM level, for example, by coupling one side of the MEMS capacitance ($C_{MEMS}$) 101 to ground using a first switch 105. During a second phase of the clock (ph2), the electrical charge in the MEMS capacitance ($C_{MEMS}$) 101 can be dumped into the input of the integrator 102, for example, by opening the first switch and closing a second switch 106. The output of the integrator is provided to a comparator 103 and the output of the comparator can provide a bit pattern stream indicative of the charge on the MEMS capacitance ($C_{MEMS}$) 101. In certain examples, a feedback loop including a feedback capacitor ($C_{FB}$) 104 can be implemented to compensate and average the MEMS charge dumped at the integrator input each cycle. In certain examples, the feedback loop can include an adder/subtractor circuit 109 driven by the output of the comparator 103. The equilibrium condition provided by the feedback loop can impose a maximum MEMS capacitance range that the feedback loop can compensate:

$$V_{PM} \cdot \Delta C_{MEMS} < V_{REF} \cdot C_{FB} \qquad \text{Eq. 1}$$

In general, the feedback capacitor ($C_m$) 104 can be optimized for the nominal acceleration range based on available proof mass voltage ($V_{PM}$) and reference level ($V_{REF}$). Normal operation for hand gesture recognition can go from few g (1 g=9.81 m/s2) to 10 g. However, even mild shocks to the acceleration system, such as a tap to the case or a drop on a rigid surface, can create peak accelerations in the hundreds of g. Such peak accelerations can be well above the maximum range that can be handled by the acceleration electronics, thus, creating over-range conditions. In certain examples, manufacturing constraints, for example, having the accel sensor housed in the same vacuum enclosure as other MEMS structure (such as a gyroscope), can force the MEMS structure to have very high quality factor (Q) in the range of thousands to tens of thousands. With such high Q, the MEMS structure can resonate at high amplitudes for very long intervals, from seconds to tens of seconds. During this high amplitude oscillation, the electronic circuit can overflow or over-range and readings can be incorrect.

A method to address the over-range condition can be to have multiple values of feedback capacitance ($C_{FB}$) to handle the larger input ranges. (A single large enough value to handle the large possible input range is far from optimum, since it creates very large quantization noise for normal input range). However, having multiple feedback capacitor values can create the need to have multiple calibration coefficients for each of these ranges, which can increase circuit complexity, test time, and calibration time.

Figure 2:
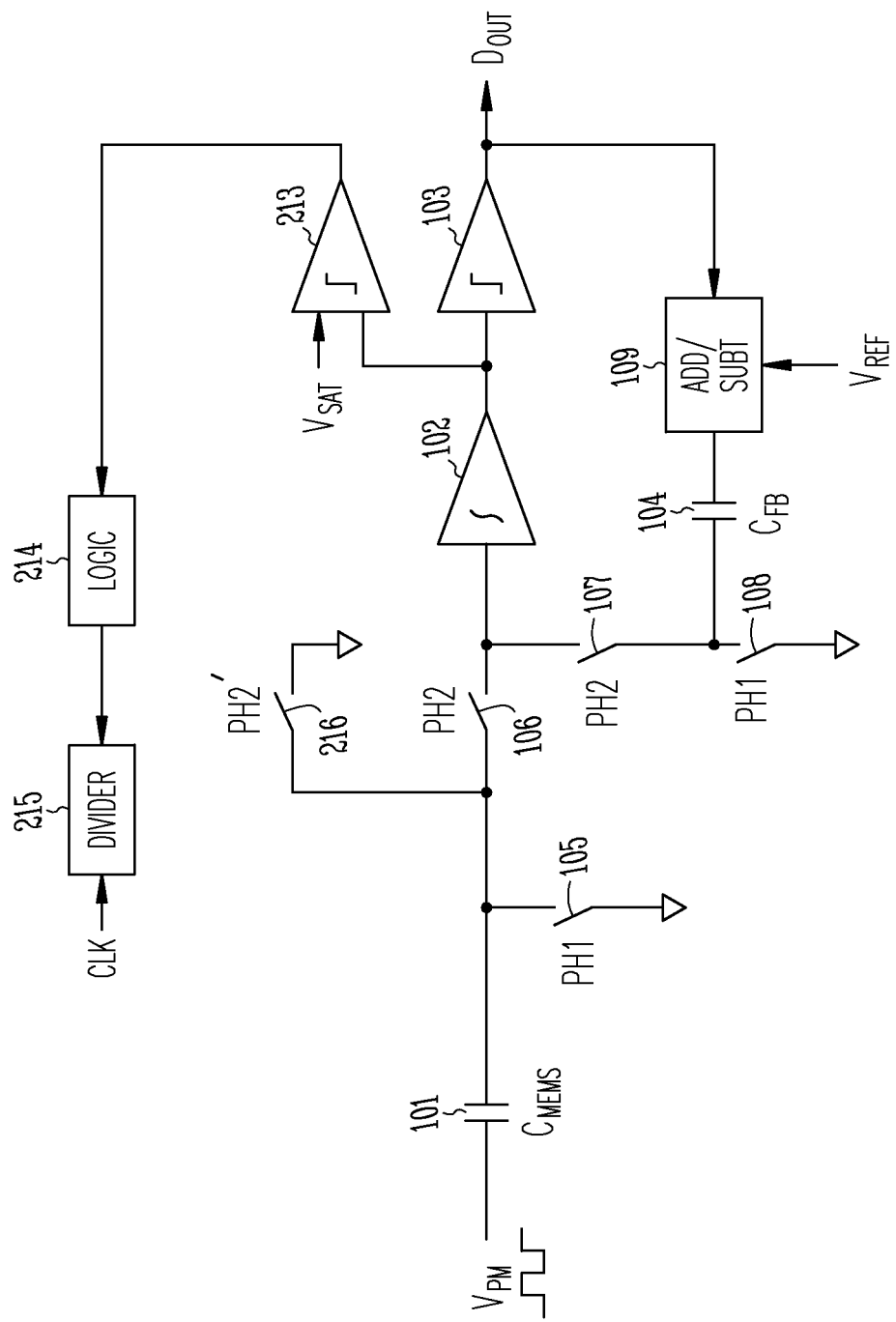
FIG. 2 illustrates generally a MEMS measurement circuit that can also handle over-range conditions.

The present inventors have recognized, among other things, several simpler mechanisms to handle over-range conditions, without the need of multiple calibrations. In certain examples, such as the example sense circuit of FIG. 2, an additional sample switch 216 can be added along with a comparator 213, logic control circuit 214 and programmable divider 215. The comparator can receive the output of the integrator 102 and can provide a signal indicative of a saturation condition of the integrator to the logic control circuit 214. Generally, if the integrator 102 reaches a saturation condition, as indicated by the output of the comparator 21, the control logic circuit 214 can program the programmable divider 215 to reduce the sample rate of the MEMS sensor using the sample switch 216. In certain examples, the sample switch 216 can be driven by a signal from the divider 215 and can selectively couple the MEMS capacitance ($C_{MEMS}$) 101 to ground to assist in avoiding or reducing saturation of the integrator 102.

The saturation comparator 213 can be used at the output of the integrator to detect when the integrator output is close to saturation. That saturation comparator output can drive a logic control circuit 214, which can, in turn, drive a programmable divider 215. Generally, second switch 106 can close each cycle to transfer charge to the integrator. If the sample switch 216 is closed, the MEMS charge can be dumped to ground. In certain examples, the programmable divider 215 can connect the switch 106 to the input of the integrator for one cycle out of every $2^N$ cycles, where N is an integer. In some examples, the programmable divider can selectively open the sample switch 216 one cycle out of every $2^N$ cycles as switch 106 is closed each cycle. In case N=0, the second switch 106 can connect every clock cycle. In certain examples, the integer N can be under logic block 214 control. In some examples, the control logic circuit 214 can check the output of the saturation comparator and can periodically adjust the value of N.

Figure 3:
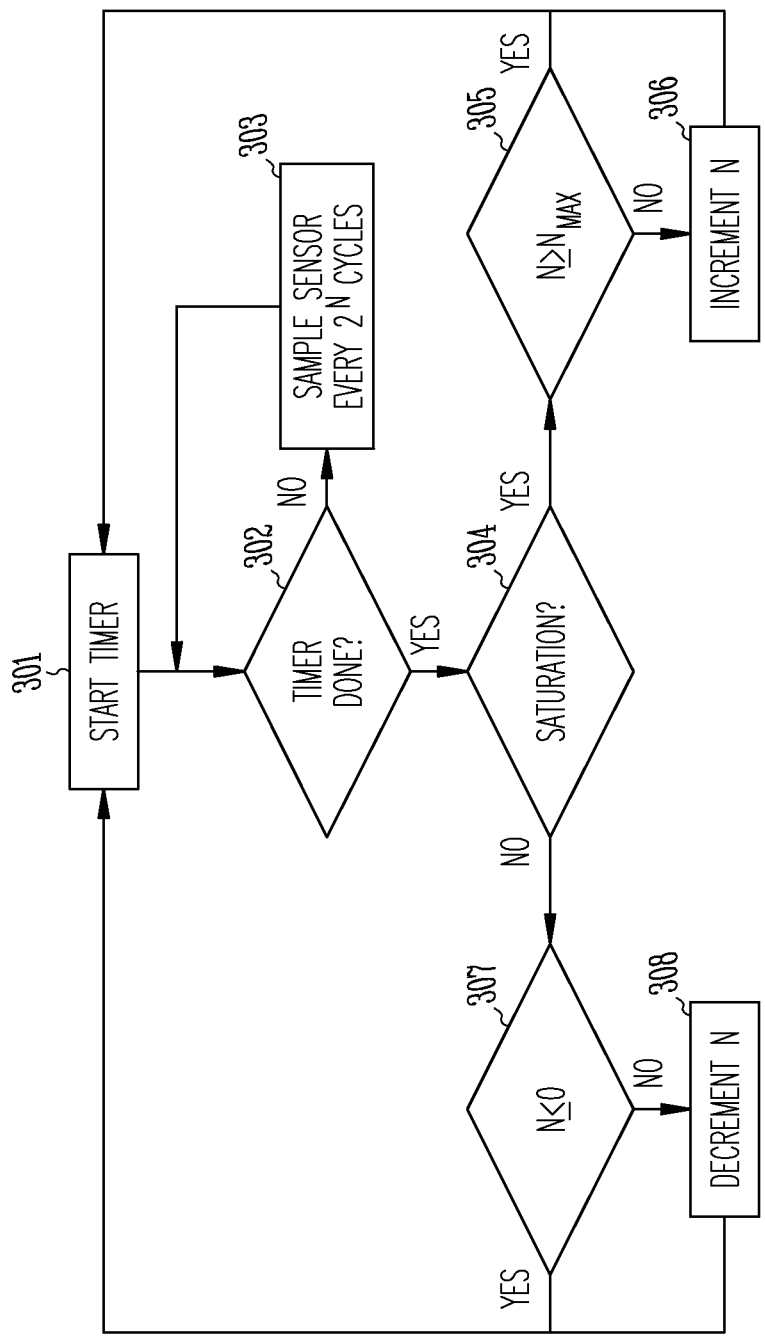
FIG. 3 illustrates generally a flowchart of an example control method for modulating a sampling rate of A MEMS sensor that can accommodate over-range conditions.

FIG. 3 illustrates generally a flowchart of an example control method for modulating N that may be executed by the control logic circuit 214. In certain examples, the control logic circuit 214 can check periodically if the input amplitude is lower by decrementing N, and repeatedly checked for integrator saturation. If the integrator saturates, N is incremented and the input is sampled each $2^N$ cycles until the saturation disappears. If no saturation occurs for a long timer (at least several decimation periods), the integer N can be decremented to N=0 if not already zero.

In certain examples, the method can include at 301 starting a timer. At 302, the control logic can check for the expiration of the timer interval. If the timer is not done, at 303, the control logic can sample the sensor each $2^N$ cycles. In certain examples and referring to FIG. 2, sampling each $2^N$ cycles can include providing a signal (PH2') that can selectively keep a sample switch 216 closed except for the $2^{Nth}$ cycle. Referring again to FIG. 3, at 304, if the timer has expired, the control logic can use an input to determine if the integrator is in saturation, such as the input provided from comparator 213 of FIG. 2. At 305, if the integrator is saturated, the control logic can determine if N is equal to, or greater than or equal to, $N_{MAX}$. If N is equal to, or greater than $N_{MAX}$, the timer can be restarted. At 306, if N is less than $N_{MAX}$, the control logic can increment N such that charge of the sensor is sampled less often to allow the integrator to come out of saturation. After incrementing N, the control logic can restart the timer. If, at 304, the integrator does not appear to be in saturation per the input from comparator 213, for example, the control logic, at 307, can determine if N is equal to, or less than or equal to, zero. If N is equal to, or less than zero, the timer can be restarted. At 308, if N is greater than zero, the control logic can decrement N such that charge of the sensor can be sampled more often. After decrementing N, the control logic can restart the timer. It is understood that selected sampling at other than $2^N$ cycle increments are possible without departing from the scope of the present subject matter. In certain examples, using the $2^N$ cycling format described above can result in very fast and straight forward digital processing at the control logic 214 and the divider 215.

In certain examples, an advantage of the proposed solution is that under-sampling of the sensor charge ($C_{MEMS}$) can be done with a precise ratio of $1/2^N$. Therefore, only one set of calibration coefficients need be provided for one of the input ranges, whereas larger input ranges will have gains with ideal powers of 2, which are easily handled with a simple digital correction.

Figure 4:
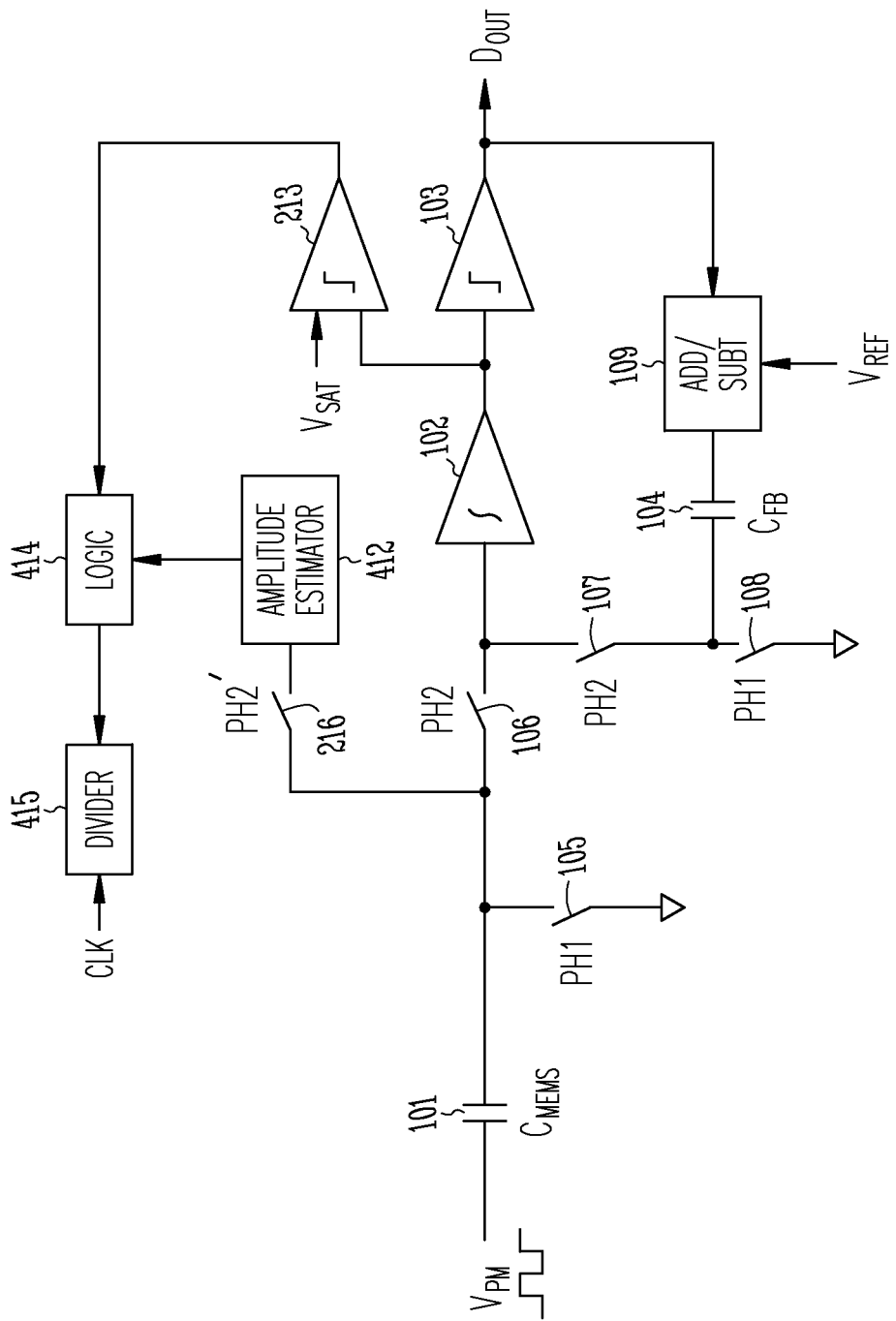
FIG. 4 illustrates generally an example sense circuit including an amplitude estimator.

FIG. 4 illustrates an alternative example sense circuit 400. In certain examples, the saturation comparator 213 of the sense circuit 400 can be complemented with an amplitude estimator 412. The amplitude estimator can provide an advantage as the logic circuit 414 does not have to check periodically for the integrator going in to and out of saturation, therefore losing data samples. In certain examples, the input sample switch 216 for the amplitude estimator can provide a sample on certain cycles and can update the amplitude estimate to the logic control circuit 414. In certain examples, the logic control circuit 414 can update the programmable divider more quickly as the logic control circuit 414 can process the input from the amplitude estimator 412 without waiting for the timer (e.g., FIG. 3, 302).

Figure 5:
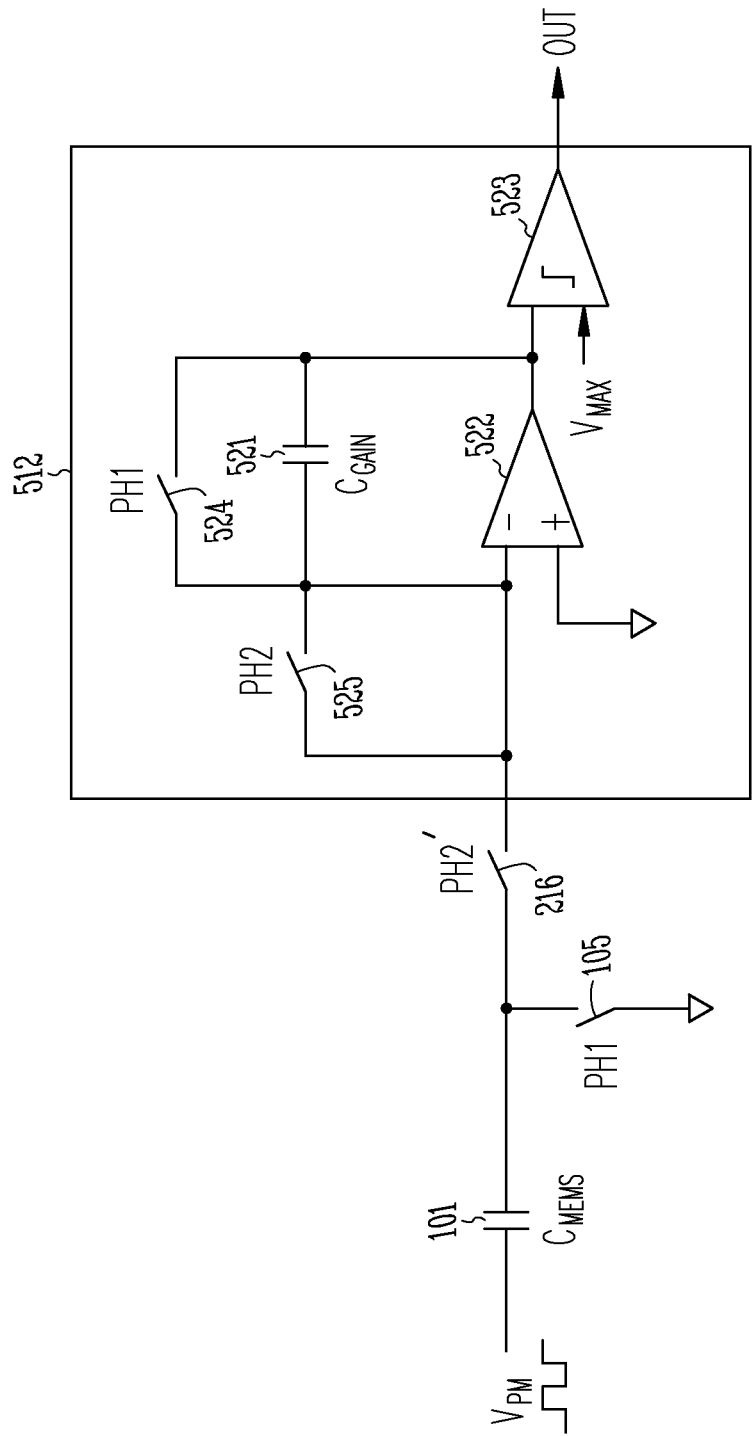
FIG. 5 illustrates generally an example amplitude estimator.

FIG. 5 illustrates generally an example amplitude estimator 512. In certain examples, the amplitude estimator 512 can be a simple switched capacitor 521 amplifier 522 followed by a comparator 523 as shown in FIG. 5. In certain examples, the amplitude estimator 512 can be activated when the logic block indicates that the MEMS accelerometer is in an over-range condition (N>0). In some examples, the gain capacitor ($C_{GAIN}$) 521 can be programmable to follow the over-range setting N. In certain examples, the output of the amplifier 522 can be proportional to the input amplitude and the comparator 523 can determine if the input amplitude is under a preset level ($V_{max}$). In certain examples, the preset level ($V_{max}$), or threshold, of the amplitude estimator 512 can be indicative of a near saturation level of the sense circuit and can be modulated based on the input range (determined by the integer N) of the sense circuit. (Can estimate whether we are heading to saturation quicker)

Referring again to FIG. 4, the logic control circuit 414 can execute a routine including the method shown in FIG. 3 with an additional input that can allow N to be more rapidly changed based on the amplitude estimate from the amplitude estimator 412. In some examples, the logic control circuit can increment N by a predetermined value each time the output of the amplitude estimator indicates a near saturation condition. In some examples, the logic control circuit can employ a look-up table where the incremental value can depend on the current value of N, for example. In certain examples, the logic control 414 of FIG. 4 can determine when the input amplitude is low enough such that the next lower input range can be selected.

Figure 6:
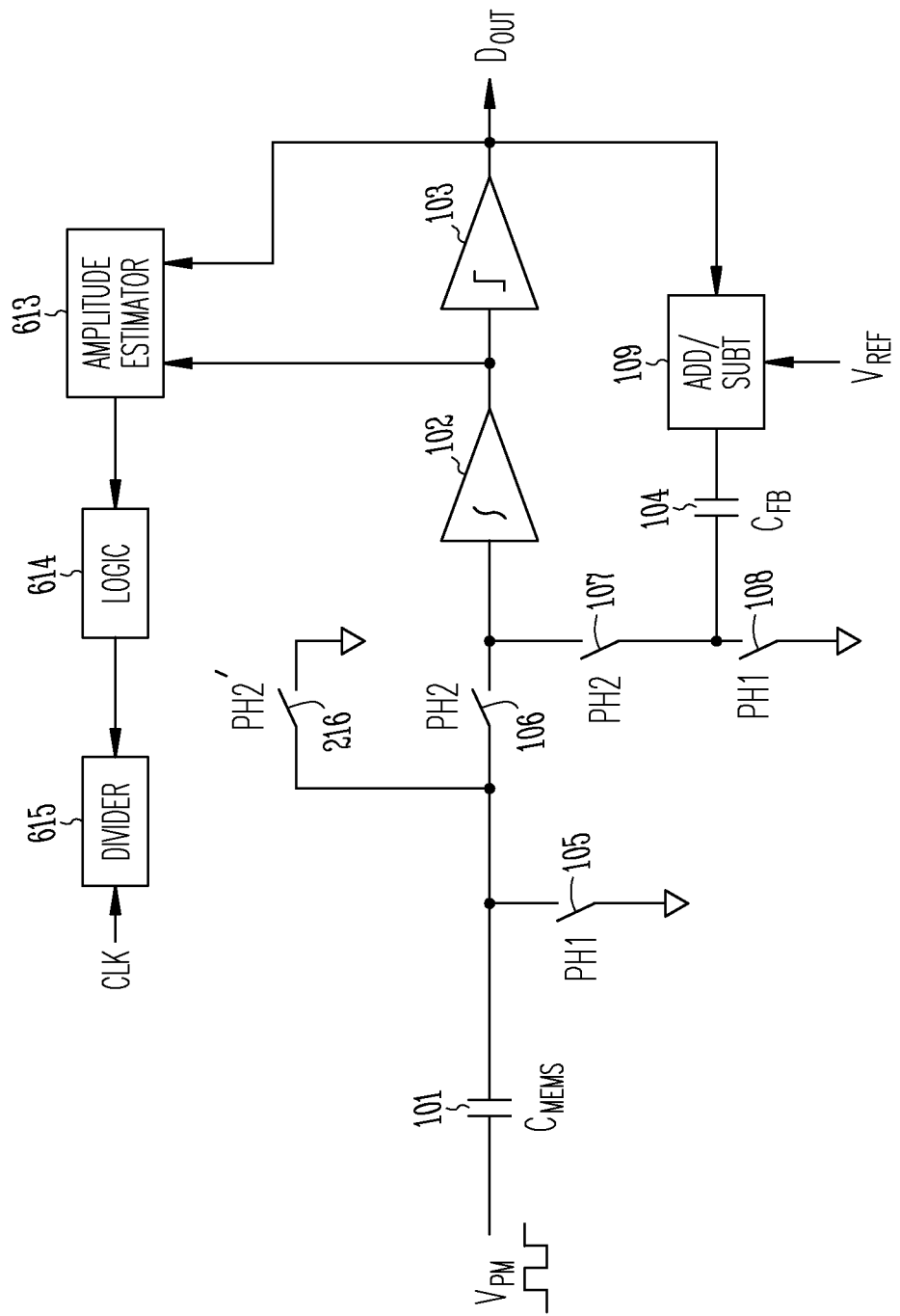
FIG. 6 illustrates generally an example sense circuit including an amplitude estimator configured to receive an output of the sense circuit integrator.

FIG. 6 illustrates generally an example sense circuit including an alternate approach for an amplitude estimator 613 that can receive the output of the integrator 102. The example of FIG. 6 includes the base components of a sigma-delta ADC including the integrator 102, quantizer or comparator 103, and the feedback path including the adder/subtractor 109 and feedback capacitor 104. Also included in the example of FIG. 6 is the phase switches (ph1) 105, 108, (ph2) 106, 107 and modified phase 2 switch (ph2') or sample switch 416. In certain examples, the amplitude estimator 613 can be connected to the output of the integrator 102 and can replace the saturation comparator (FIG. 2, 213; FIG. 4, 213). The amplitude estimator 613 can be based on the analog output of the integrator 102, which is:

$$V_{out} = \frac{(Q_{MEMS} - Q_{FB} \cdot d) \cdot z^{-1}}{C_{INT} \cdot (1 - z^{-1})} \qquad \text{Eq. 2}$$

where $Q_{MEMS}$ is the sensor charge dumped in one cycle, $Q_{FB}$ is the charge added or subtracted from the integrator input by the feedback capacitor $C_{FB}$, and $C_{INT}$ is the integration capacitor.

The input value $Q_{MEMS}$ and therefore the input amplitude can be obtained with a differentiator:

$$Q_{MEMS} = V_{out} \cdot C_{INT} \cdot (1-z^{-1}) + Q_{FB} \cdot d \cdot z^{-1} \qquad \text{Eq. 3}$$

Figure 7:
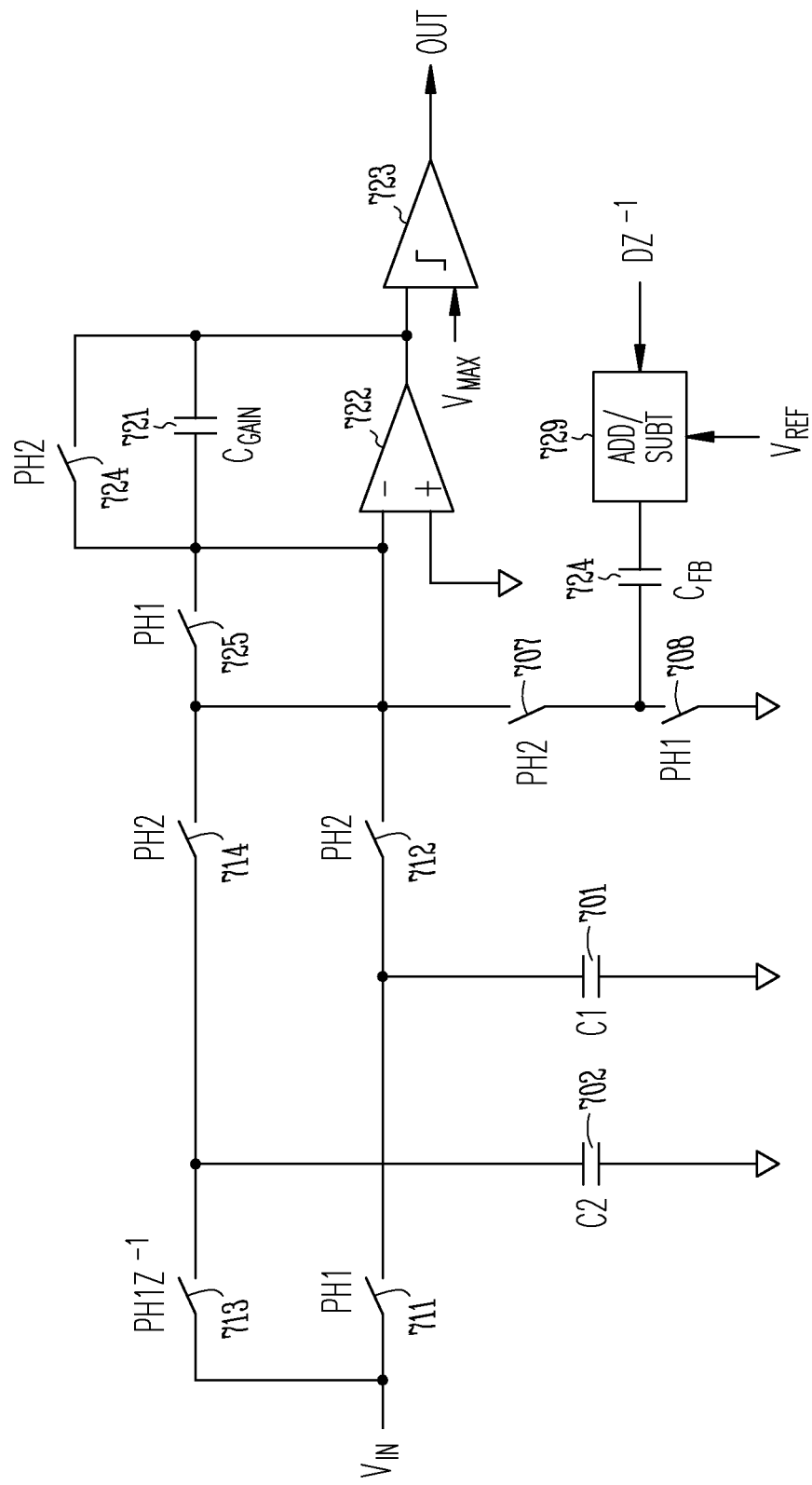
FIG. 7 illustrates generally an example active implementation of an amplitude estimator for the sense circuit of FIG. 6.

FIG. 7 illustrates generally an example active implementation of an amplitude estimator, such as the amplitude estimator 613 of FIG. 6, configured to receive the output of the sensor circuit integrator 602 as shown in FIG. 6. The amplitude estimator can include a switched capacitor amplifier 722, a switch or gain capacitor ($C_{GAIN}$) 721, a comparator 723 and a feedback loop including an adder/subtractor circuit 729 and a feedback capacitor 724. In certain examples, the gain capacitor ($C_{GAIN}$) 721 can be programmable to follow the over-range setting N. The output of the amplifier 722 can be proportional to the input amplitude and the comparator 723 can determine if the input amplitude is under a preset level ($V_{max}$). In certain examples, the preset level can be indicative of a saturation level of the sensor circuit. In some examples, the Eq. (3) function can be implemented with 2 samples (one of them delayed by one clock cycles) of the input level. Two sets of capacitor (C1) 701, (C2) 702, phase one switches 708, 711, 713, 725 and phase 2 switches 707, 712, 714, 724 can open and close during alternating phases of the clock in order to delay the sampled input by one clock cycle, to subtract the delayed sampled input from the present input, and to sum the feedback charge provide by the combination of the feedback capacitor 724 and the adder/subtractor circuit 729. Further, phase one switches 711 and 713 alternate their operation to store alternate samples of Vin on the sample capacitors 701, 702 where for each estimation of the charge one the MEMS sensor ($Q_{MEMS}$), one of the sample capacitors can have the most recent charge sample and the other capacitor can have the preceding sample.

Figure 8:
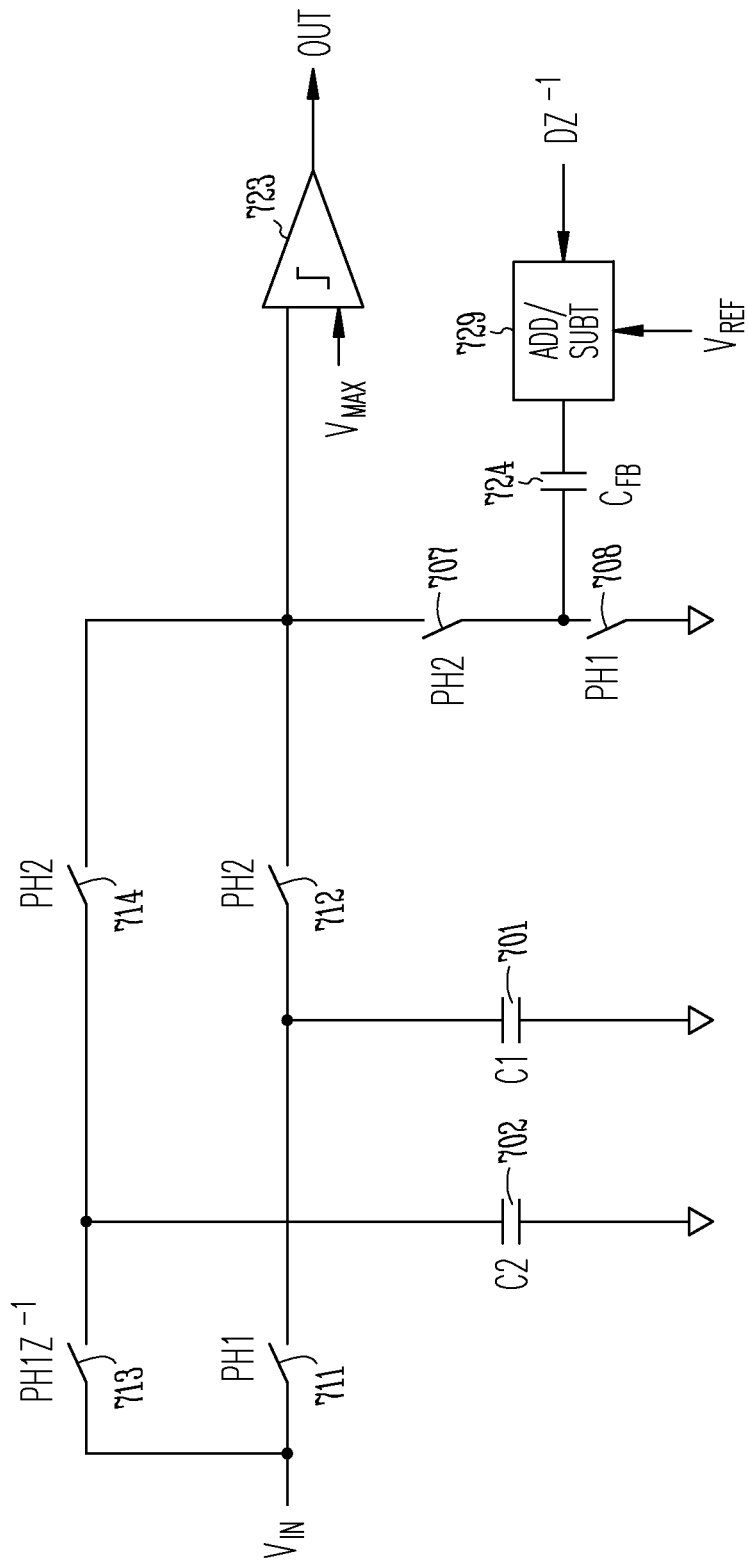
FIG. 8 illustrates generally an example passive implementation of an amplitude estimator for the sense circuit of FIG. 6.

FIG. 8 illustrates generally an example passive implementation, since the amplitude estimation does not have to be very precise. The summation can be done directly at the comparator 823 input, without the operational amplifier (722 in FIG. 7).

As discussed briefly above, MEMS sense circuits can be very sensitive and can have a high Q because the typical sensing process involves sensing very small changes in the charge stored on the sensor electrode(s). When the sensor is subjected to high acceleration forces, for example, from being bumped or dropped, in addition to saturating the sense circuit, oscillation of the sensor mechanism can take a long time to settle. However, the present inventors have recognized that oscillations can be actively settled, or damped, quicker by applying a charge signal to the sensor capacitor(s) that is out of phase with the sensor oscillation. In certain examples, an estimator of the input amplitude can be used to actively damp the MEMS resonance using electrostatic force. In certain examples, such damping can reduce the time the MEMS structure needs to recover after an over-range shock. In certain examples, an amplitude estimator can be used to sense the phase of the sensor oscillation and can provide an indication of when to apply an out of phase electrostatic force to damp the sensor oscillation.

Figure 9:
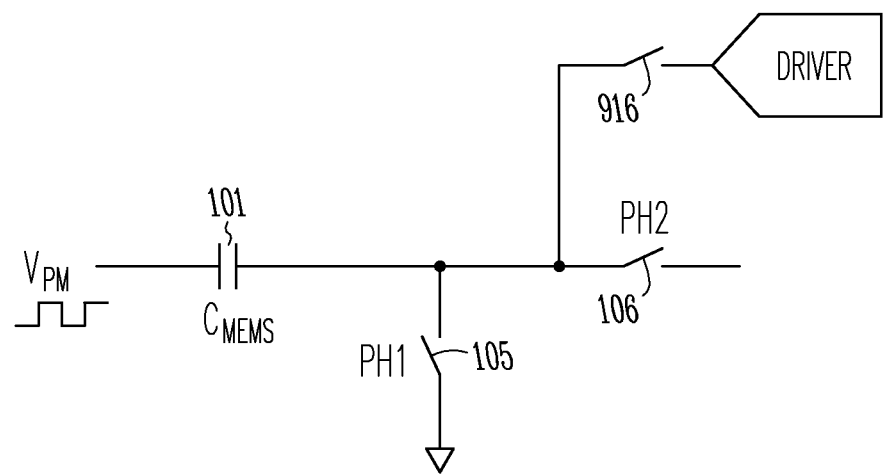
FIG. 9 illustrates generally an example circuit for applying an electrostatic force to a MEMS sensor electrode.

FIG. 9 illustrates generally an example circuit for applying an electrostatic force to a sensor electrode using a driver and, for example, the input switch or sample switch 916. During the clock cycles when the $C_{MEMS}$ is not used for active input sampling (which are $2^N-1$ out of every $2^N$ cycles in certain examples), a voltage can be forced at the input sense electrode ($C_{MEMS}$ node) to generate an electrostatic force on the sense electrode to counteract the mechanical oscillation of the sensor. In certain examples, the sample switch 916 can be closed for the entire clock cycle rather than for one phase of the clock, to increase the time the electrostatic force is applied. The voltage to be forced on the sense electrode can be in phase with the proof mass voltage ($V_{PM}$) for zero electrostatic force, or 180 degrees out of phase for maximum attractive electrostatic force. In a fully differential implementation, the attractive electrostatic force can be applied to one side or both sides of a proof mass. In certain examples, efficient damping of mechanical oscillations can include applying an electrostatic force at 90 degrees phase with respect to the mechanical oscillation. In certain examples, an amplitude estimator or derivative estimator can be employed to estimate a derivative of the mechanical motion. In certain examples, the polarity of the derivative can be used to apply the electrostatic force at the proper time and, in certain differential examples, to the proper electrode.

Figure 10:
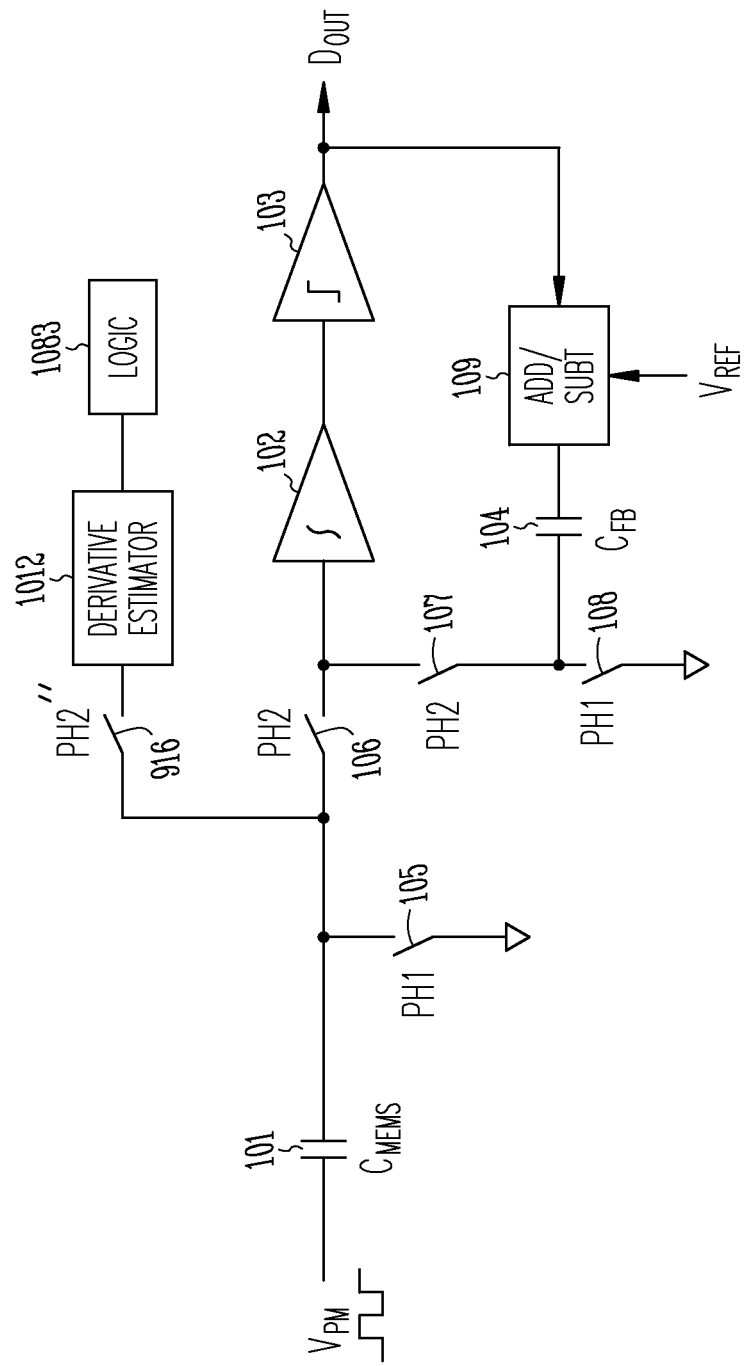
FIG. 10 illustrates generally an example sense circuit including a derivative estimator.

FIG. 10 illustrates generally an example sense circuit including a derivative estimator. In certain examples, the derivative estimator can work during over-range condition and can estimate the input derivative when the sample switch 1016 is closed.

Figure 11:
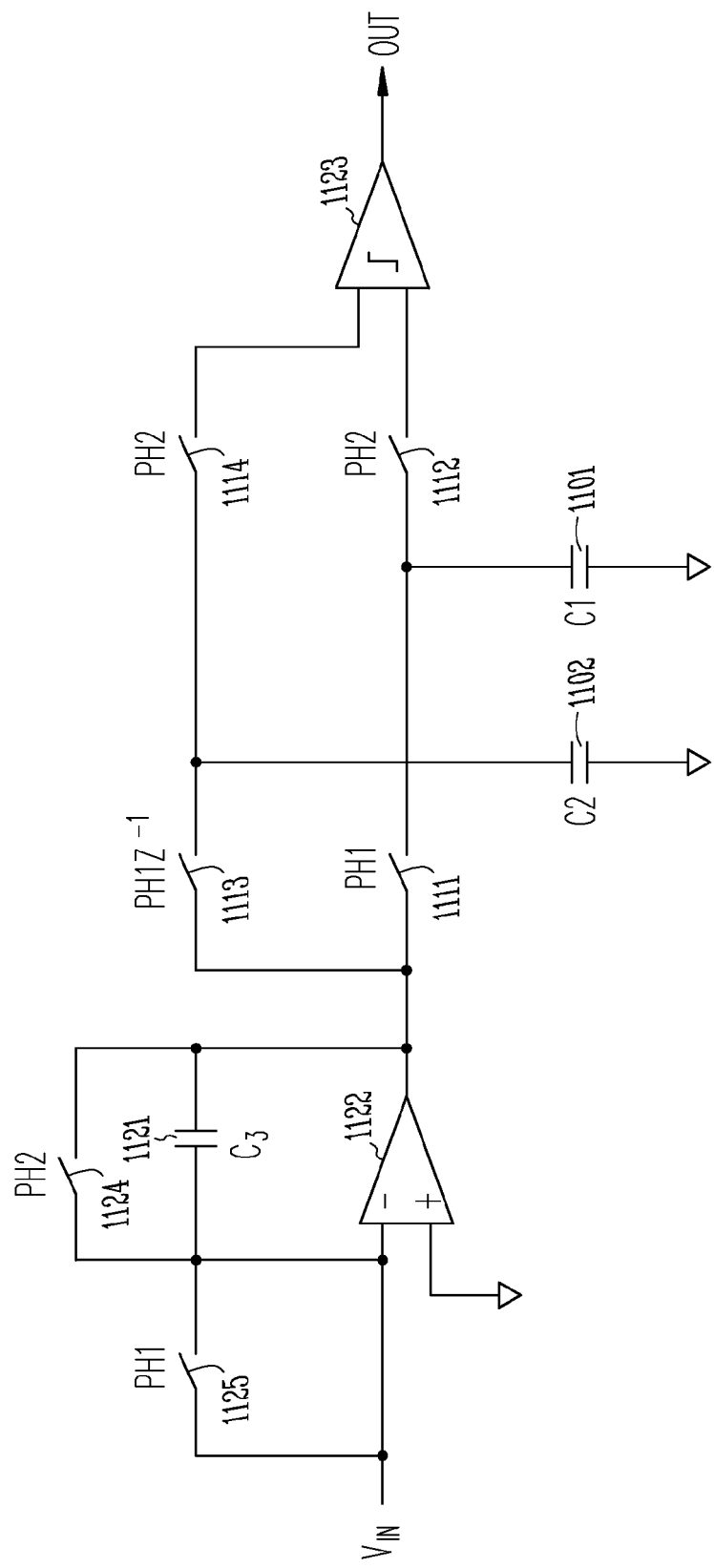
FIG. 11 illustrates generally an example implementation of a derivative estimator.
Figure 12:
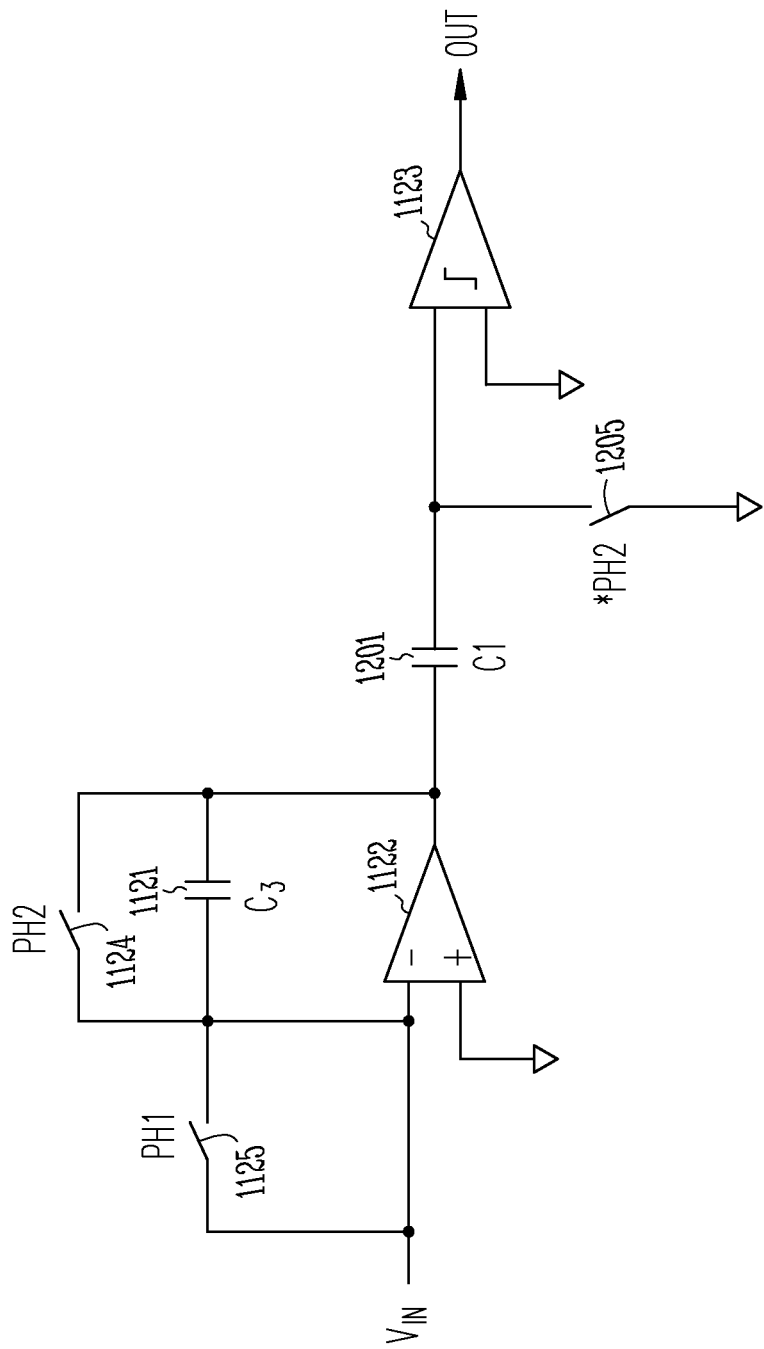
FIG. 12 illustrates an example implementation of a derivative estimator.

An example implementation of the derivative estimator is shown in FIG. 11. In certain examples, the derivative estimator can use a transcapacitance circuit with opamp 1122 and C3 1121 to provide a virtual ground node at the input and a bank of sampling capacitors C1 and C2 to compare the present sample and a clock delayed sample using a comparator 1123. An alternative example implementation of the derivative circuit is shown in FIG. 12, where the value of a first sample can be stored on the capacitor C1 during a first phase when a special phase two switch (*ph2) is closed and during a second phase, a more recent sample can be compared to the first phase sample, and an input of the comparator 1223 can have the difference between the current sample and the previously stored sample.

Figure 13:
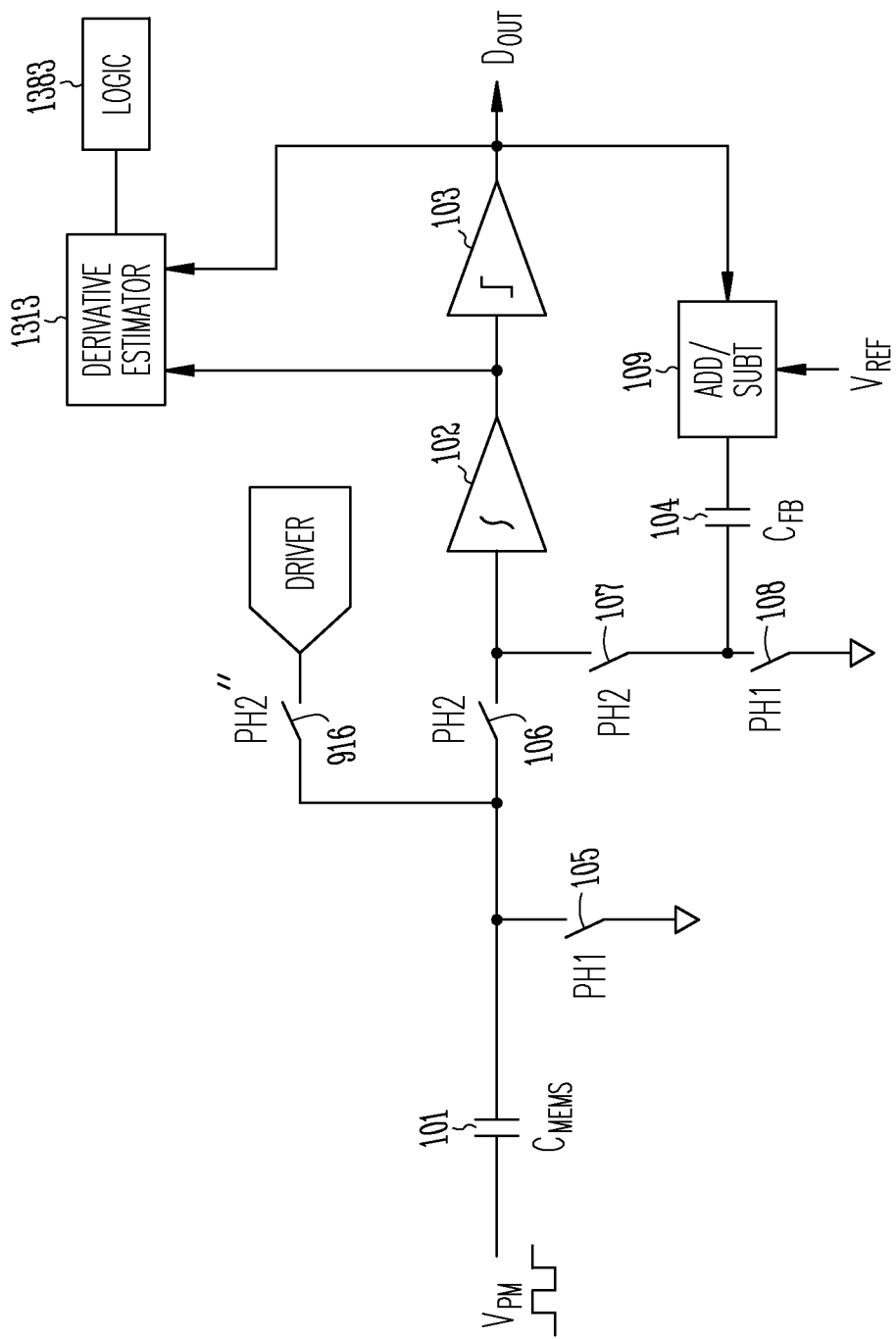
FIG. 13 illustrates generally an example sense circuit including a derivative estimator configured to receive the output of the sense circuit integrator.

An example alternative approach for the derivative estimator is shown in FIG. 13. The derivative estimator can be connected to the output of the main integrator. The derivative estimation can take into consideration the transfer function of the main integrator (equation (2)). The derivative circuit can estimate a derivative of the mechanical amplitude given by equation (3), which can be written as:

$$Q_{MEMS} \cdot z^{-1} = V_{out} \cdot C_{INT} (1 - z^{-1} \cdot z^{-N} + z^{-1-N}) + Q_{FB} \cdot d \cdot (z^{-1} - z^{-1-N})$$ Eq. 4 where N is an integer that can take into account that during over-range conditions the input is sampled every $2^N$ clock cycles. Upon determining the derivative of the mechanical amplitude, a driver can receive a signal from the derivative estimator, during cycles not used for measurement, to apply a damping signal to the sense capacitance ($C_{MEMS}$) 101 and thus reduce the time needed for the proof mass movement of the MEMS sensor to recover, in terms of saturation of the integrator 102, from an over-range event.

Figure 14:
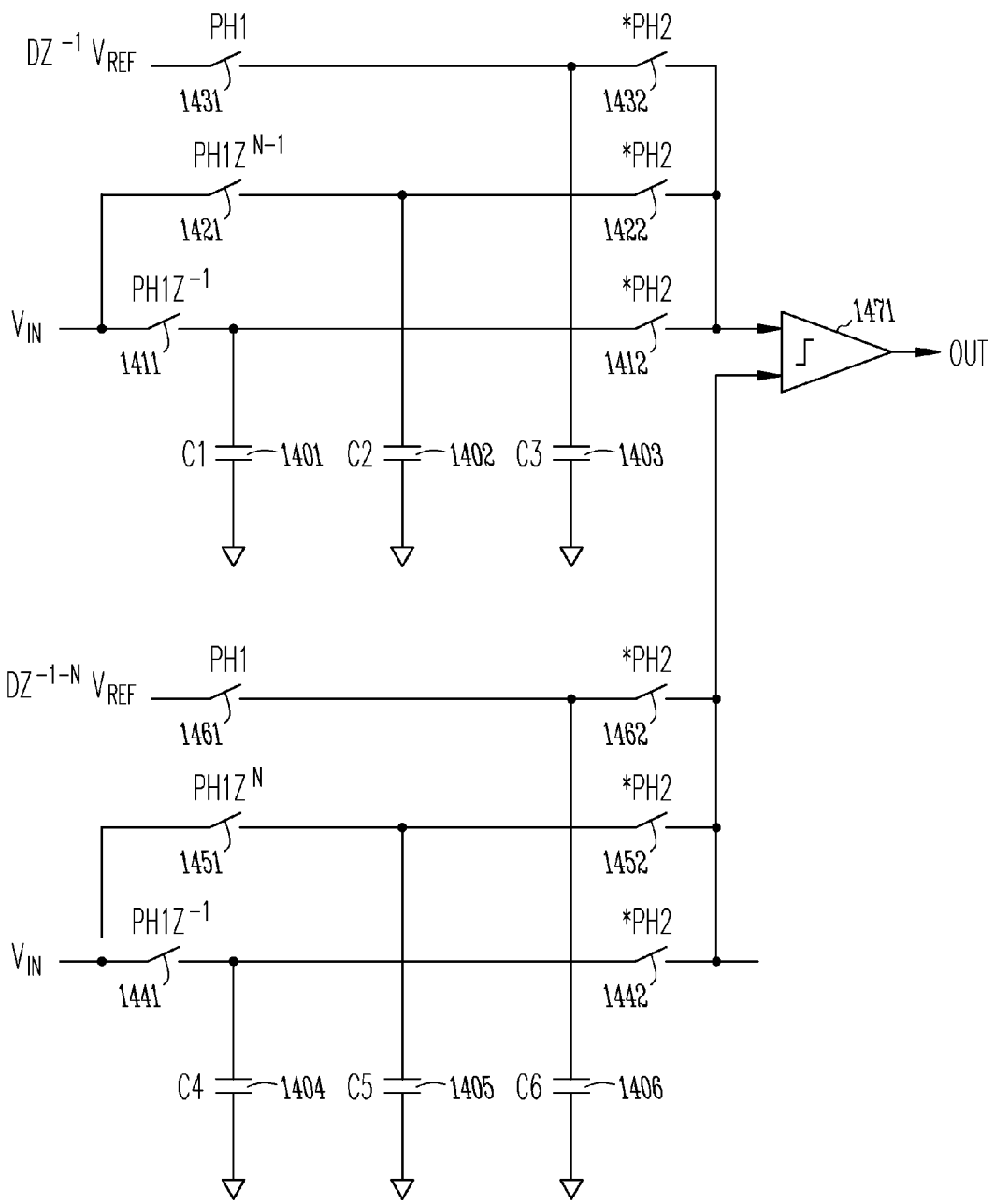
FIG. 14 illustrates generally an example passive implementation of a derivative estimator.

FIG. 14 illustrates generally an example simple passive implementation. A bank of capacitors can be used to store the various delayed samples of charge associated with the first term of equation 4 (Eq. 4) as well as the delayed samples of the reference ($V_{REF}$). The stored values can be summed and compared at the comparator 1471 to provide an indication of the derivative estimate. After the prescribed number of samples are stored and compared, the charge on the sample capacitors 1401-1406 can be dumped during phase 2 of the next cycle using a number of switches (*ph2) 1412, 1422, 1432, 1442, 1452, 1462.

In certain examples, to prevent the corruption of the net acceleration reading during over-range conditions while applying an electrostatic force, a simple digital counter can be used to equalize the number of clock cycles that the electrostatic force is applied to each side of the MEMS sense electrodes, (1083 in FIG. 10 and 1383 in FIG. 13).

In certain examples, the present subject matter can allow the electronic circuit to handle much larger input amplitudes in a MEMS accelerometer and automatically recover to normal input ranges after the internal MEMS oscillations die out. In certain examples, the input is sampled only once out of every $2^N$ clock cycles, where N is an integer under logic circuit control, and the gain factor is an exact factor of a power of two, that can be easily corrected in digital, without requiring multiple analog calibration for various input ranges. In some examples, the sense electrodes are used for actively damping the internal MEMS oscillation by forcing an electrostatic force to counteract the mechanical oscillations. In certain examples, a circuit can be used to equalize the electrostatic force applied to each of the differential sense electrodes to not corrupt the net acceleration reading during over-range conditions.

ADDITIONAL NOTES AND EXAMPLES

In Example 1, an apparatus can include an integrator circuit configured to provide a signal indicative of an integration of charge on a sense capacitor of a MEMS sensor, a sample switch circuit configured to selectively couple the sense capacitor with an input of the integrator circuit, a comparator configured to compare an output of the integrator circuit to a threshold and to provide an output pulse stream indicative of the charge on the sense capacitor, a feedback circuit having a feedback capacitor, the feedback circuit coupled between an output of the comparator and the input of the integrator circuit, a saturation detector configured to receive the signal indicative of the integration of charge, to compare the signal indicative of the integration of charge to an integrator saturation threshold and to modulate a divide parameter using the comparison of the signal indicative of the integration of charge and the integrator saturation threshold, and a controller configured receive a clock signal and to control the sample switch circuit based on a phase of the clock signal and the divide parameter.

In Example 2, the saturation detector of Example 1 optionally is configured to increment the divide parameter when the integration of the charge is greater than the integration threshold.

In Example 3, the saturation detector of any one or more of Examples 1-2 optionally is configured to decrement the divide parameter when the integration of the charge is less than the integration threshold.

In Example 4, the saturation detector of any one or more of Examples 1-3 optionally includes a charge amplitude estimator and configured to provide an indication of an amplitude of the charge on the sense capacitor of the MEMS sensor.

In Example 5, the charge amplitude estimator any one or more of Examples 1-4 optionally includes an input coupled to an input of the integrator.

In Example 6, the charge amplitude estimator any one or more of Examples 1-5 optionally includes an input coupled to an output of the integrator.

In Example 7, the charge amplitude estimator of any one or more of Examples 1-6 optionally includes an amplifier, and a switched capacitor coupled between an input of the amplifier and an output of the amplifier.

In Example 8, the switched capacitor of any one or more of Examples 1-7 optionally is programmable.

In Example 9, the apparatus of any one or more of Examples 1-8 optionally includes a damping circuit configured to provide a damping signal to the sense capacitor of the MEMS sensor.

In Example 10, the damping circuit of any one or more of Examples 1-9 optionally includes a derivative estimator and a driver.

In Example 11, the derivative estimator of any one or more of Examples 1-10 optionally is configured to receive motion information of a proof mass of the MEMS sensor using the sense capacitor and to provide trigger information to the driver, the trigger information indicative of when to apply a damping signal to the sense capacitor to dampen oscillatory motion of the proof mass.

In Example 12, the driver any one or more of Examples 1-11 optionally is configured to apply the damping signal to the sense capacitor using the sample switch.

In Example 13, a method can include providing a signal indicative of an integration of charge on a sense capacitor of a MEMS sensor using an integrator circuit, comparing the signal indicative of the integration of charge to an integrator saturation threshold, modulating a divide parameter using the comparison of the signal indicative of the integration of charge and the integrator saturation threshold, and controlling a sample switch coupled to the sense capacitor and an input of the integrator circuit based on a phase of the clock signal and the divide parameter.

In Example 14, the method of any one or more of Examples 1-13 optionally includes selectively coupling the sense capacitor with an input of the integrator circuit using the sample switch circuit, comparing an output of the integrator circuit to a threshold using a comparator, providing an output pulse stream from the comparator indicative of the charge on the sense capacitor, and receiving the signal indicative of the integration of charge at a saturation detector.

In Example 15, the method of any one or more of Examples 1-14 optionally includes selectively shorting the sense capacitor with a reference voltage using the sample switch circuit;

In Example 16, the method of any one or more of Examples 1-15 optionally includes comparing an output of the integrator circuit to a threshold using a comparator, providing an output pulse stream from the comparator indicative of the charge on the sense capacitor, and receiving the signal indicative of the integration of charge at a saturation detector.

In Example 17, the method of any one or more of Examples 1-2 optionally includes providing a damping signal to the sense capacitor of the MEMS sensor using a damping circuit.

In Example 18, the providing a damping signal any one or more of Examples 1-17 optionally includes receiving motion information of a proof mass of the MEMS sensor at the damping circuit using the sense capacitor, and providing trigger information to a driver, the trigger information indicative of when to apply the damping signal to the sense capacitor to dampen oscillatory motion of the proof mass.

In Example 19, the providing a damping signal of any one or more of Examples 1-18 optionally includes applying the damping signal to the sense capacitor using the sample switch.

In Example 20, the providing a damping signal any one or more of Examples 1-19 optionally includes electrically coupling an output of the driver the sense capacitor using the sample switch.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
   an integrator circuit configured to provide a signal indicative of an integration of charge on a sense capacitor of a MEMS sensor;
   a sample switch circuit configured to selectively couple the sense capacitor with an input of the integrator circuit;
   a comparator configured to compare an output of the integrator circuit to a threshold and to provide an output pulse stream indicative of the charge on the sense capacitor;
   a feedback circuit having a feedback capacitor, the feedback circuit coupled between an output of the comparator and the input of the integrator circuit;
   a saturation detector configured to receive the signal indicative of the integration of charge, to compare the signal indicative of the integration of charge to an integrator saturation threshold and to modulate a divide parameter using the comparison of the signal indicative of the integration of charge and the integrator saturation threshold; and a controller configured receive a clock signal and to control the sample switch circuit based on a phase of the clock signal and the divide parameter.

2. The apparatus of claim 1, wherein the saturation detector is configured to increment the divide parameter when the integration of the charge is greater than the integrator saturation threshold.

3. The apparatus of claim 2, wherein the saturation detector is configured to decrement the divide parameter when the integration of the charge is less than the integrator saturation threshold.

4. The apparatus of claim 1, wherein the saturation detector includes a charge amplitude estimator and configured to provide an indication of an amplitude of the charge on the sense capacitor of the MEMS sensor.

5. The apparatus of claim 4, wherein the charge amplitude estimator includes an input coupled to an input of the integrator circuit.

6. The apparatus of claim 4, wherein the charge amplitude estimator includes an input coupled to an output of the integrator circuit.

7. The apparatus of claim 4, wherein the charge amplitude estimator includes:
an amplifier; and
a switched capacitor coupled between an input of the amplifier and an output of the amplifier.

8. The apparatus of claim 7, wherein the switched capacitor is programmable.

9. The apparatus of claim 1, including a damping circuit configured to provide a damping signal to the sense capacitor of the MEMS sensor.

10. The apparatus of claim 9, wherein the damping circuit includes a derivative estimator and a driver.

11. The apparatus of claim 10, wherein the derivative estimator is configured to receive motion information of a proof mass of the MEMS sensor using the sense capacitor and to provide trigger information to the driver, the trigger information indicative of when to apply a damping signal to the sense capacitor to dampen oscillatory motion of the proof mass.

12. The apparatus of claim 11, wherein the driver is configured to apply the damping signal to the sense capacitor using the sample switch circuit.

13. A method comprising:
providing a signal indicative of an integration of charge on a sense capacitor of a MEMS sensor using an integrator circuit;
receiving the signal indicative of the integration of charge at a saturation detector;
comparing the signal indicative of the integration of charge to an integrator saturation threshold;
modulating a divide parameter using the comparison of the signal indicative of the integration of charge and the integrator saturation threshold; and
controlling a sample switch coupled to the sense capacitor and an input of the integrator circuit based on a phase of a clock signal and the divide parameter.

14. The method of claim 13, including:
selectively coupling the sense capacitor with an input of the integrator circuit using the sample switch;
comparing an output of the integrator circuit to a threshold using a comparator; and
providing an output pulse stream from the comparator indicative of the charge on the sense capacitor.

15. The method of claim 13, including selectively shorting the sense capacitor with a reference voltage using the sample switch.

16. The method of claim 15 including:
comparing an output of the integrator circuit to a threshold using a comparator;
providing an output pulse stream from the comparator indicative of the charge on the sense capacitor; and
receiving the signal indicative of the integration of charge at a saturation detector.

17. The method of claim 13, including providing a damping signal to the sense capacitor of the MEMS sensor using a damping circuit.

18. The method of claim 17, wherein the providing a damping signal includes receiving motion information of a proof mass of the MEMS sensor at the damping circuit using the sense capacitor; and
providing trigger information to a driver, the trigger information indicative of when to apply the damping signal to the sense capacitor to dampen oscillatory motion of the proof mass.

19. The method of claim 18, wherein the providing a damping signal includes applying the damping signal to the sense capacitor using the sample switch.

20. The method of claim 18, wherein the providing a damping signal includes electrically coupling an output of the driver the sense capacitor using the sample switch.

* * * * *